May 20, 1969  L. M. SIERACKI ET AL  3,444,876
PROPORTIONAL COMPARATOR
Filed Sept. 19, 1966

INVENTORS,
LEONARD M. SIERACKI
CARL J. CAMPAGNUOLO
FRANCIS E. BLODGETT

United States Patent Office 3,444,876
Patented May 20, 1969

3,444,876
PROPORTIONAL COMPARATOR
Leonard M. Sieracki, Beltsville, Carl J. Campagnuolo, Chevy Chase, and Francis E. Blodgett, Silver Spring, Md., assignors to the United States of America as represented by the Secretary of the Army
Filed Sept. 19, 1966, Ser. No. 580,554
Int. Cl. F15c 1/12, 1/14
U.S. Cl. 137—81.5      9 Claims

ABSTRACT OF THE DISCLOSURE

A means for receiving plural pressure signals and for producing a fluid output proportional to the difference in the fluid signals. If the flow pressure in one input channel exceeds that of another input channel a low pressure area will be created by entrainment in a channel connecting the two input channels causing more fluid to be directed out one output channel than the other. Auxiliary channels are used to further control the proportionality of the output flow.

---

This invention relates to a pure fluid proportional mixing device for use in fluid systems and in particular for use in aircraft systems.

In foil-supported aircraft systems it is desirable that constant measurements of control conditions be made to monitor the orientation of the aircraft. Normally, there are several different conditions to be measured and it is desirable that a single output signal can be obtained which is proportional to the different measurements to be taken. In conventional aircraft foil systems the control measurements are amplified and applied to a mechanical actuator to control the condition of the foil that the control measurement represents. Known devices for monitoring a control signal are generally very delicate in construction and require fine adjustment for normal operation. It is therefore obvious that any improvement in the ruggedness of the monitoring device of the control measurements would advance dependability in rugged flight conditions and eliminate extensive adjustments.

Another disadvantage of the normal monitoring systems is the need to translate the control measurement signal into the type of energy needed by the mechanism for rendering corrective action of the aircraft foil. An example of this would be in the conventional type of system used to stabilize airfoil angles of attack. The conventional means for doing this comprises a device to detect a fluid pressure which is indicative of the angle of attack, electric transducer means to convert the fluid pressure into an electric signal, and electrically operated means to mechanically reorientate the foil in accordance with the control measurement. It would be preferable if the fluid pressure signal detected by the control measurement device could be used directly to effect a change in the aircraft foil position without the need to convert the pressure signal into one or more different forms of energy. The problem of converting fluid signals to electrical signals is similarly present when more than one control measurement is taken and it is necessary to combine the fluid signals to produce a corrective action on the aircraft foil.

The present invention provides for the reception of plural pressure signals and a fluid output proportional to chamber 17, are substantially aligned with sides 30 and the differences in the fluid signals eliminating the need for any intermediary energy converting devices. In accordance with the present invention it is intended that the fluid output be used to control a fluid amplifier which would render corrective action on an aircraft foil.

It is therefore an object of the present invention to provide for means to detect an aircraft foil position and to use this information to provide a fluid signal which can be used to provide a fluid input for a fluid amplifier which can be used to provide corrective action for an aircraft foil.

Another object of the invention is to provide a pure fluid system wherein the output is proportional to the difference in two sensed pressures.

A further object of the invention is to provide a pure fluid system where the fluid output is proportional to the differences in two pairs of sensed pressures.

The above and still further objects, features and advantages of the present invention will become apparent upon consideration of the following detailed written description and drawings wherein.

Figure 1:
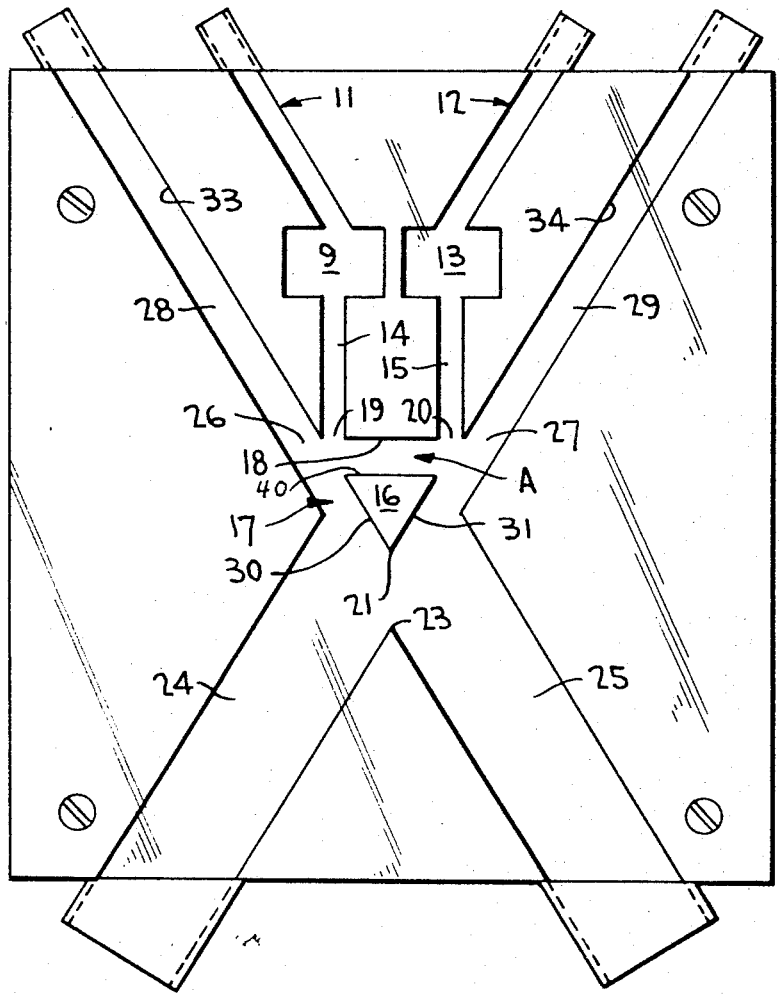
FIGURE 1 is a schematic representation of a proportional fluid mixing amplifier in accordance with the present invention.
Figure 2:
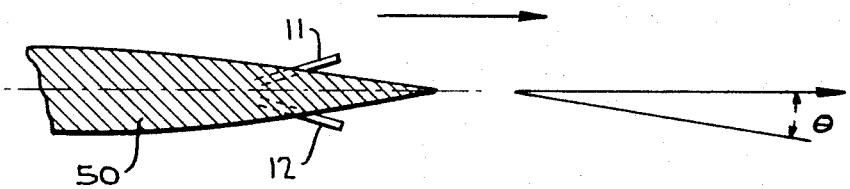
FIGURE 2 illustrates schematically the present invention used in conjunction with an aircraft.

In FIGURE 1, the pure fluid proportional mixing device comprises two fluid input signal receiving conduits 11 and 12. These conduits may be attached to pitot tubes to detect the angle of attack $\theta$ of an aircraft foil 50 as shown in FIGURE 2. Stagnation tanks 9 and 13 may be provided to improve the flow characteristics of the fluid signal received by the pitot tubes in a manner well known in the art. If the pure fluid proportional mixing device were used in an environment other than an aircraft foil, the need for the stagnation tanks could be eliminated. Each stagnation tank 9 and 13, via conduits 14 and 15, respectively, communicates with an interaction chamber 17. Present in interaction chamber 17 is a triangular prism 16 whose purpose will shortly be disclosed. Conduits 14 and 15 are substantially parallel to each other and communicate with the interaction chamber 17 by ports 19 and 20, respectively. Ports 19 and 20 are separated by a divider 18 which is substantially perpendicular to the conduits 14 and 15, respectively. The triangular prism 16 is placed in interaction chamber 17 so one of its sides 40 is substantially parallel to and equal in width to divider 18 and a short distance from said divider and forming between said divider and said prism pressure region A. It is to be noted that the width of the sides of the triangular prism are to be approximately the same as the width of divider 18. The apex 21 of triangular prism 16 is the furthermost point of the triangular prism away from divider 18. A short distance beyond apex 21 is a splitter 23. Splitter 23 serves to define output passages 24 and 25 which can lead to a fluid operated device which could render corrective action for an aircraft foil in one embodiment. Adjacent ports 19 and 20 are ports 26 and 27, respectively. Ports 26 and 27 lead to the interaction chamber 17 and each port is connected to a second set of fluid input signal receiving conduits 28 and 29, respectively. Conduits 28 and 29 are adapted to be connected to a second set of pressure taps or sensors which serve to fluidly indicate a second condition, such as airfoil velocity. The inner walls 33 and 34 of conduits 28 and 29, which direct fluid via ports 26 and 27 into interaction 31, respectively, of triangular prism 16.

There are three possible operating conditions for the proportional fluid mixing amplifier of FIGURE 1.

In the first condition the pressure signals detected by receiving conduits 11 and 12 are of equal magnitude. The region labeled A is a low pressure region, because the fluid from ports 19 and 20 flowing past A will tend to entrain fluid from A. When the pressure signals selected by receiving conduits 11 and 12 are equal in magnitude neither fluid stream issuing from 19 and 20 will be able to dominate the other. Region A, because it is at a lower pressure, will cause the streams from 19 and 20 to be drawn along sides 30 and 31, respectively of triangular prism 16. However, since the magnitude of each stream issuing from 19 and 20 is equal, the fluid streams which are drawn to sides 30 and 31, respectively, of triangular prism 17, will split equally at or a little downstream of apex 21 and flow equally into output passages 24 and 25.

The second operating condition is when the magnitude of the pressure detected by conduits 11 and 12 are dissimilar. Assuming for purposes of illustration that conduit 11 receives a greater pressure signal than conduit 12. The fluid detected by conduit 11 and issuing from port 19 will flow past region A and entrain the fluid there creating a low pressure region in A. This will cause the fluid detected by conduit 12 and issuing from port 20 to tend to be directed to wall 31 because of low pressure region at A and cause part of the flow to be directed to output passage 24 along with the fluid from port 19. For a greater magnitude of fluid signal detected by conduit 11 a greater amount of entrainment of fluid from region A will occur which will decrease the pressure in the region A and increase the amount of fluid from port 20 which will be guided to wall 31 of the triangular prism 16 and into output passage 24. Since the magnitude of fluid flow from port 20 is less than that from port 19, because of the reduced signal detected by channel 12, the flow past A from port 20 will not be able to dominate the fluid stream from port 19 to passage 25 but itself will be dominated by the fluid from port 19. It is easy to see that for greater flows from port 19 a greater entrainment in region A will occur and this will direct more of the fluid from port 20 to side 31 of the triangular prism 16 which will result in a greater output in passage 24, giving the system greater proportionability.

The third condition is where the signal detected by conduit 12 is greater than conduit 11. The result obtained by this situation is the opposite of the second condition and will be readily understood.

Auxiliary detecting conduits can be applied to the proportional fluid mixing amplifier as necessary, for example, to detect aircraft rate. An example of an auxiliary fluid signal will be illustrated.

Assuming a pair of pressure signals are applied to receiving conduits 11 and 12, as disclosed above, a portion of the fluid will issue from passages 24 and 25 in proportion to the signals at 11 and 12. If an auxiliary signal is detected by conduits 28 and 29, the fluid issuing from ports 26 and 27, respectively, will act like the ordinary controls of a fluid amplifier and further increase the proportionality of the unit. An example would be where because of the greater magnitude of the signal detected by conduit 11 than conduit 12 the majority of the output will be in conduit 24. If the signal detected in conduit 28 is greater than that detected in conduit 29 the fluid from port 26 will dominate over the fluid from port 27 and impinge on the fluid leading to passage 24 tending to move a portion of the power stream past the splitter 23 thus decreasing the output in passage 24 and increasing the output to passage 25. It is believed that other combinations of magnitudes of fluid signals received will be obvious to those skilled in the art.

It is apparent from the above disclosure that we have invented a pure fluid proportional system where four fluid signals can be detected and transformed into a single fluid output which is proportional to the four fluid signals.

We claim as our invention:

1. A pure fluid proportional comparator comprising:
   (a) a fluid interaction chamber,
   (b) a pair of inlet conduits adapted to each sense a particular fluid pressure condition and communicate, via ports, said condition with said interaction chamber,
   (c) a pair of output passages communicating with said fluid interaction chamber, and
   (d) means in said interaction chamber to sense the difference in pressure magnitudes between said inlet conduits and to direct fluid from said pair of inlet conduits to said output passages in proportion to the pressure difference between said sensed magnitudes, said means in said interaction chamber to sense the difference in pressure magnitudes between said inlet conduits and to direct fluid from said pair of inlet conduits to said outlet passages in proportion to the pressure difference between said sensed magnitudes, said means comprising a prism having at least three sides placed in said interaction chamber so that a channel is formed connecting said inlet conduits.

2. A device according to claim 1 wherein:
   (a) said inlet conduits leading to said interaction chamber are substantially parallel to each other and said ports are separated by a divider, and
   (b) said means in said interaction chamber to sense the difference in pressure magnitudes between said inlet conduits and to direct fluid from said pair of inlet conduits to said outlet passages in proportion to the pressure difference between said sensed magnitudes comprises a prism having at least three sides placed in said interaction chamber so that one of said sides is parallel to and separated from said divider and so that a channel is formed connecting said inlet conduits.

3. A device according to claim 2 wherein said one side of said prism is approximately equal in width to said divider.

4. A device according to claim 1 wherein auxiliary conduit means are provided adjacent said pair of inlet conduits to provide additional sensed fluid conditions to said interaction chamber to also proportionately control the flow to said outlet passages.

5. A device according to claim 4 wherein said inlet conduits leading to said interaction chamber are substantially parallel to each other and said ports are separated by a divider.

6. A device according to claim 5 wherein one side of said prism is parallel to said divider and approximately equal to said divider in width.

7. A device according to claim 6 wherein said pair of auxiliary conduits are inclined with respect to said inlet conduits so that the fluid issuing from said auxiliary conduits will impinge against the fluid from the respective inlet conduits to direct the latter.

8. A device according to claim 7 wherein said auxiliary conduits are each in alignment with a respective side of said prism.

9. A pure fluid proportional comparator device comprising:
   (a) a fluid interaction chamber,
   (b) a pair of inlet conduits adapted to each sense a particular fluid pressure condition and communicate via ports said condition with said interaction chamber, (c) said inlet conduits are substantially parallel and said respective ports are separated by a divider which is substantially perpendicular to said inlet conduits,
(d) a splitter communicating with said interaction chamber, said splitter defining a pair of outlet passages,
(e) a triangular prism having sides in said interaction chamber and having one side parallel to said divider and substantially equal in width with said divider,
(f) a pair of auxiliary signal receiving conduits adjacent each of said inlet conduits and each aligned with a respective side of said triangular prism.

References Cited
UNITED STATES PATENTS

| | | | |
|---|---|---|---|
| 3,080,886 | 3/1963 | Severson | 137—81.5 |
| 3,238,959 | 3/1966 | Bowles | 137—81.5 |
| 3,209,774 | 10/1965 | Manion | 137—81.5 |
| 3,323,532 | 6/1967 | Campagnuolo | 137—81.5 |
| 3,326,463 | 6/1967 | Reader | 137—81.5 XR |
| 3,340,885 | 9/1967 | Bauer | 137—81.5 |
| 3,366,131 | 1/1968 | Swartz | 137—81.5 |

SAMUEL SCOTT, *Primary Examiner.*